United States Patent
Jo et al.

(10) Patent No.: US 11,843,117 B2
(45) Date of Patent: *Dec. 12, 2023

(54) ANODE FOR SECONDARY BATTERY, HAVING OPTIMIZED BINDER DISTRIBUTION, AND SECONDARY BATTERY COMPRISING SAME

(71) Applicant: SK INNOVATION CO., LTD., Seoul (KR)

(72) Inventors: Byoung-Wook Jo, Daejeon (KR); Hyun-Joong Jang, Daejeon (KR); Min-Hwan Kim, Daejeon (KR)

(73) Assignee: SK ON CO., LTD., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/570,204

(22) Filed: Jan. 6, 2022

(65) Prior Publication Data

US 2022/0131152 A1   Apr. 28, 2022

Related U.S. Application Data

(63) Continuation of application No. 17/267,989, filed as application No. PCT/KR2019/011104 on Aug. 30, 2019.

(30) Foreign Application Priority Data

Aug. 31, 2018 (KR) .................. 10-2018-0103144
Aug. 16, 2019 (KR) .................. 10-2019-0100358

(51) Int. Cl.
*H01M 4/62* (2006.01)
*C08L 9/06* (2006.01)
(Continued)

(52) U.S. Cl.
CPC .............. *H01M 4/622* (2013.01); *C08L 9/06* (2013.01); *H01M 4/483* (2013.01); *H01M 4/587* (2013.01);
(Continued)

(58) Field of Classification Search
None
See application file for complete search history.

(56) References Cited

U.S. PATENT DOCUMENTS

2004/0258991 A1   12/2004   Choi et al.
2005/0158624 A1    7/2005   Park et al.
(Continued)

FOREIGN PATENT DOCUMENTS

CN       1641916 A     7/2005
CN     105122507 A    12/2015
(Continued)

OTHER PUBLICATIONS

Elina Pohjalainen et al., Water-Soluble Acrylate Binder for Graphite Electrodes in Lithium-Ion Batteries, Energy Technology, Jan. 27, 2016, pp. 470-472, vol. 4, No. 4, Wiley-VCH Verlag Gmbh&Co. KGaA, Weinheim, Germany.

(Continued)

*Primary Examiner* — Wyatt P McConnell
(74) *Attorney, Agent, or Firm* — IP & T GROUP LLP

(57) ABSTRACT

An anode for a non-aqueous electrolyte secondary battery includes: an anode current collector; and an anode mixture layer formed on the anode current collector, containing an anode active material, a conductor, a rubber-based binder, and a water-soluble polymer-based binder. The anode mixture layer comprises, relative to a total weight thereof, 1.0-2.5 wt % of the rubber-based binder and 0.5-1.5 wt % of the water-soluble polymer based binder. When the anode mixture layer is divided into ten equal parts in the thickness (Continued)

direction based on the current collector, a ratio (CA/CB) at an interval of 0 to 3 of a content ratio (CA) of the rubber-based binder to a total content of the rubber-based binder to a content ratio (CB) of the water-soluble polymer-based binder to a total content of the water-soluble polymer-based binder is larger than 1.0, and a ratio (CA/CB) at an interval of 7 to 10 is smaller than 1.0.

16 Claims, 4 Drawing Sheets

(51) Int. Cl.
    *H01M 4/48*     (2010.01)
    *H01M 4/587*     (2010.01)
    *H01M 10/0525*     (2010.01)
    *H01M 4/02*     (2006.01)

(52) U.S. Cl.
    CPC ....... *H01M 4/625* (2013.01); *H01M 10/0525* (2013.01); *H01M 2004/027* (2013.01)

(56) References Cited

U.S. PATENT DOCUMENTS

| | | |
|---|---|---|
| 2009/0202907 A1 | 8/2009 | Muraoka et al. |
| 2010/0273052 A1 | 10/2010 | Sakitani et al. |
| 2015/0263333 A1 | 9/2015 | Kinugawa et al. |
| 2016/0056471 A1* | 2/2016 | Sugimori ................ H01M 4/13 429/217 |
| 2016/0329557 A1* | 11/2016 | Sugimori ............... H01M 4/483 |
| 2016/0351892 A1 | 12/2016 | Sugimori et al. |
| 2017/0309410 A1 | 10/2017 | Yamagata et al. |
| 2018/0040880 A1 | 2/2018 | Andersen et al. |
| 2018/0062158 A1 | 3/2018 | Kim et al. |
| 2018/0205064 A1 | 7/2018 | Lee et al. |
| 2019/0027740 A1 | 1/2019 | Lee et al. |

FOREIGN PATENT DOCUMENTS

| | | |
|---|---|---|
| CN | 105849954 A | 8/2016 |
| CN | 107408669 A | 11/2017 |
| CN | 107785535 A | 3/2018 |
| JP | 2014-120330 A | 6/2014 |
| KR | 10-2010-0112127 A | 10/2010 |
| KR | 10-2015-0034498 A | 4/2015 |
| KR | 10-2017-0111743 A | 10/2017 |
| KR | 10-2018-0009084 A | 1/2018 |
| KR | 10-2018-0040268 A | 4/2018 |
| WO | 2014/68904 A1 | 5/2014 |
| WO | 2014/156095 A1 | 10/2014 |
| WO | 2015/098021 A1 | 7/2015 |
| WO | 2015/115051 A1 | 8/2015 |

OTHER PUBLICATIONS

Rongyu Zhang et al., Water soluble styrene butadiene rubber and sodium carboxyl methyl cellulose binder for ZnFe2O4 anode electrodes in lithium ion batteries, Journal of Power Sources, Jul. 1, 2015, pp. 227-234, vol. 285, Elsevier B.V.

Notice of Allowance issued by the Korean Intellectual Property Office dated May 28, 2021.

Extended European Search Report issued by the European Patent Office dated Sep. 30, 2021.

Office Action for the Chinese Patent Application No. 201980054236.4 issued by the Chinese Patent Office dated July 1, 2023.

* cited by examiner

ANODE FOR SECONDARY BATTERY, HAVING OPTIMIZED BINDER DISTRIBUTION, AND SECONDARY BATTERY COMPRISING SAME

This application is a continuation of U.S. patent application Ser. No. 17/267,989 filed on Feb. 11, 2021, which is a national stage application of PCT/KR2019/011104 filed on Aug. 30, 2019, which claims priority of Korean patent application number 10-2018-0103144 filed on Aug. 31, 2018 and 10-2019-0100358 filed on Aug. 16, 2019. The disclosure of each of the foregoing applications is incorporated herein by reference in its entirety.

TECHNICAL FIELD

The present disclosure relates to an anode for a secondary battery, more specifically to a technology for enhancing battery performance by improving binder distribution in terms of an anode for a secondary battery.

BACKGROUND ART

Mobile information terminals, such as mobile phones, laptop computers and tablet computers, have been rapidly improving in functionality, compactness and weight reduction. As a driving power source for such terminals, a non-aqueous electrolyte secondary battery having high capacity and high energy density is being widely used.

As an anode active material of the non-aqueous electrolyte secondary battery, carbon materials are widely used. Due to increasing demand for high capacity of such non-aqueous electrolyte secondary batteries, however, silicon materials having higher discharge capacity, compared to carbon materials, are drawing attention.

As a technique for a non-aqueous electrolyte secondary battery using a silicon material, Japanese Patent No. 6128481 discloses that in a non-aqueous electrolyte secondary battery having an anode plate on which an anode active material layer having an anode active material and a binder is formed on an anode body, the anode active material includes a silicon oxide and a carbonaceous material, a mass of the silicon oxide is 1% to 20% by mass with respect to a sum of the silicon oxide mass and a carbonaceous material mass, and a ratio (O/Si) of an oxygen atom over a silicon atom of the silicon oxide is 0.5 to 1.5, the binder includes a binder A formed of a rubber having a double bond and a binder B formed of a water-soluble polymer compound, wherein the binder A is distributed more in the anode body as compared to on a surface of the anode active material layer, and the binder B is present at least around the silicon oxide.

The JP patent specifies distributions of the binders A and B on an anode plate including SiOx, but is silent on contents thereof.

DISCLOSURE

Technical Problem

It is common that in an anode of a non-aqueous electrolyte secondary battery, a rubber-based binder and a water-soluble polymer-based binder are used to maintain binding force between an anode active material and an anode current collector. In consideration of effects of the binders on the binding force, the aim of the present invention is to improve quality and performance of a product by optimizing a distribution of each binder for each electrode position as compared to the case of using the same amount of the binders.

Technical Solution

The present invention provides an anode for a non-aqueous electrolyte secondary battery, including an anode current collector; and an anode mixture layer formed on the anode current collector and comprising an anode active material, a conductive material, a rubber-base binder and a water-soluble polymer-based binder, wherein the anode mixture layer comprises 1.0 wt % to 2.5 wt % of the rubber-based binder and 0.5 wt % to 1.5 wt % of the water-soluble polymer-based binder, based on a total weight of the anode mixture layer, and when the anode mixture layer is divided into 10 equal parts in a thickness direction starting from a surface of the anode current collector, a ratio $(C_A/C_B)$ of a content ratio $(C_A)$ of the rubber-based binder at intervals of part 0 to 3 to a total content of the rubber-based binder to a content ratio $(C_B)$ of the water-soluble polymer-based binder at intervals of part 0 to 3 to a total content of the water-soluble polymer-based binder is greater than 1.0, and a ratio $(C_A/C_B)$ at intervals of part 7 to 10 is smaller than 1.0.

It is preferable that a content of the rubber-based binder be greater at the intervals of part 0 to 3 than at the intervals of part 7 to 10.

It is preferable that the $C_A/C_B$ of the intervals of part 0 to 3 be 1.02 to 1.50 and the $C_A/C_B$ of the interval of part 7 to 10 be 0.50 to 0.98. It is also preferable that the $C_A/C_B$ of the intervals of part 0 to 3 be 1.07 to 1.48 and the $C_A/C_B$ of the intervals of part 7 to 10 be 0.52 to 0.95.

A content of the rubber-based binder may be greater at the intervals of part 0 to 3 and smaller at the intervals of part 7 to 10 as compared to a total content thereof in an entire interval.

The rubber-based binder may be at least one selected from the group consisting of a styrene butadiene rubber (SBR), a fluorine-based rubber, an ethylene propylene rubber, a butyl acrylate rubber, a butadiene rubber, an isoprene rubber, an acrylonitrile rubber, an acrylic-based rubber and a silane-based rubber.

The water-soluble polymer-based binder may be at least one selected from the group consisting of carboxymethylcellulose, cellulose, polyvinylpyrrolidone, polyvinyl alcohol, polyacrylate and derivatives thereof.

The anode active material may be at least one selected from the group consisting of natural graphite or artificial graphite, soft carbon, hard carbon and a silicon oxide, and the conductive material may be at least one selected from the group consisting of acetylene carbon black, Ketjenblack, carbon nanotubes, graphene and graphite.

The anode mixture layer may have a ratio $(C_A/C_B)$ greater than 1.0 at intervals of part 3 to 5, and a ratio $(C_A/C_B)$ smaller than 1.0 at intervals of part 5 to 7.

Further, the present invention provides a non-aqueous electrolyte secondary battery including the anode described above.

Advantageous Effects

According to the present invention, an anode can alleviate peeling of an anode mixture layer from an anode current collector as well as improving battery performance.

BEST MODE

Figure 1:
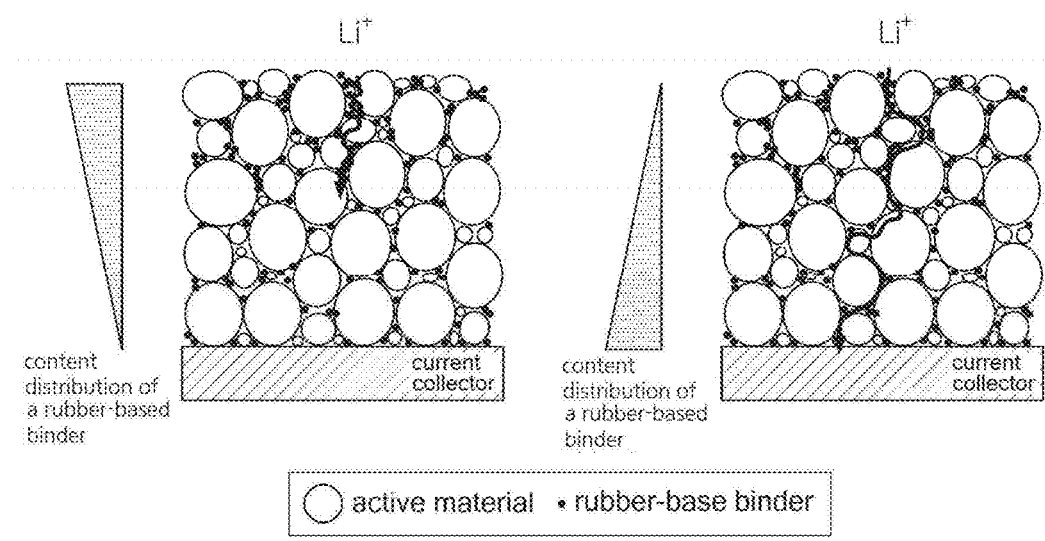
FIG. 1 is a diagram schematically illustrating a concept regarding diffusion of lithium ions in accordance with a content distribution of a rubber-based binder in a thickness direction of an anode mixture layer.

The present invention relates to a non-aqueous electrolyte secondary battery including an anode mixture layer formed by applying an anode active material, a rubber-based binder and a water-soluble polymer-based binder onto an anode current collector.

Specifically, the anode provided herein includes an anode current collector and an anode mixture layer formed on the anode current collector and including an anode active material, a conductive material, a rubber-base binder and a water-soluble polymer-based binder applied thereto.

The binders basically serve to maintain adhesion between the anode active materials and adhesion between the active materials and the anode current collector. The anode mixture layer includes 1.0 wt % to 2.5 wt % of the rubber-based binder and 0.5 wt % to 1.5 wt % of the water-soluble polymer-based binder based on a total weight of the anode mixture layer.

When a total amount of the rubber-based binder included in the anode mixture layer is less than 1.0 wt %, the adhesion between the anode active materials may be deteriorated. Also, due to insufficient ductility of the anode mixture layer, cracking may readily occur during a drying or rolling process. When the amount exceeds 2.5 wt %, movements of electrons and lithium ions in the battery may be inhibited, thereby significantly increasing cell resistance.

The rubber-based binder is not particularly limited, but may be at least one selected from the group consisting of a styrene butadiene rubber (SBR), a fluorine-based rubber, an ethylene propylene rubber, a butyl acrylate rubber, a butadiene rubber, an isoprene rubber, an acrylonitrile rubber, an acrylic-based rubber and a silane-based rubber.

When an amount of the water-soluble polymer-based binder in the anode mixture layer is less than 0.5 wt %, not only the adhesion between the anode active materials is deteriorated but also viscosity of a slurry is reduced, thereby leading to problems such as reduced phase stability of the slurry and an increased thickness of an edge portion during coating. In contrast, when the amount exceeds 1.5 wt %, viscosity of the slurry excessively increases, which leads to reduced coating processability and makes it difficult to dissolve the water-soluble polymer-based binder, thereby forming micro-gel.

The water-soluble polymer-based binder may be at least one selected from the group consisting of carboxymethylcellulose, cellulose, polyvinylpyrrolidone, polyvinyl alcohol, polyacrylate and derivatives thereof.

Meanwhile, the anode mixture layer of the present invention includes an anode active material and a conductive material in addition to the rubber-based and water-soluble polymer-based binders. The anode active material and the conductive material may be any one of materials conventionally used and may be included in any amount conventionally employed in formation of an anode mixture layer, and is not particularly limited herein.

As the anode active material, a graphite-based material, a non-graphite-based material and silicon oxides may be used. Examples of the graphite-based material are natural graphite, artificial graphite, and the like. Those of the non-graphite-based material are soft carbon, hard carbon, and the like. These can be used independently, or two or more thereof may be combined to use.

Examples of the conductive material are carbon black, Ketjen black, a carbon nanotube, graphene, graphite, and the like. Any of these carbon materials can be used independently, or two or more thereof can be combined for use.

As described above, the anode mixture layer is manufactured by adding water to a mixture of the anode active material, the conductive material, and the rubber-based and the water-soluble polymer-based binders to prepare a slurry and applying the slurry onto the anode current collector followed by drying. Although not particularly limited, the water, for example, distilled water, may be contained in an amount range of 40 wt % to 60 wt %, based on a total weight of the slurry.

The anode mixture layer obtained by the present invention allows the anode active materials to adhere to each other and to the anode current collector by the water-soluble polymer-based and rubber-based binders.

The water-soluble polymer-based binder has high affinity to water, which leads to swelling by absorbing moisture when exposed thereto. When a comparatively large amount of such water-soluble polymer-based binders are present on an interface of the anode mixture layer and the anode current collector, a portion of the mutual adhesion among the anode active material, the binder and the anode current collector is replaced with mutual adhesion between the moisture and the binders. This may deteriorate the adhesion between the anode active material and the anode current collector. Such deterioration of the adhesion may serve to peeling of the anode mixture layer from the anode current collector when an electrolyte solution is charged.

Meanwhile, the rubber-based binder has low affinity to moisture and thus does not create a problem of deteriorated adhesion due to moisture absorption as the above. Accordingly, it is more preferable that a rubber-based binder is used rather than a water-soluble polymer-based binder at an interval close to the anode current collector to improve adhesion between the anode active material and the anode current collector, that is, an anode body.

Meanwhile, the rubber-based binders are non-uniformly present among the anode active materials in the form of small particles. When such rubber-based binders are present in a large amount on the anode mixture layer, particularly a surface of the anode mixture layer, surface pores between the anode active materials are suppressed, and the lithium ions delivered from a cathode are suppressed from being diffused into the anode.

The concept of the diffusion of lithium ions in accordance with a content distribution of the rubber-based binder is schematically illustrated in FIG. 1. As illustrated in FIG. 1, the rubber-based binders present on a surface of the anode mixture layer in a large amount interferes with delivery of lithium ions and inhibits diffusion of the lithium ions into the anode.

As a result, the battery resistance increases, or charging/discharging efficiency decreases due to lithium plating formed on an electrode surface during high rate charging.

When the amount of the rubber-based binder present on the surface is small, however, the lithium ions can be easily diffused into the anode, thereby preventing such a problem.

As described above, each of the rubber-based binders and water-soluble polymer-based binders have different effects on adhesion and battery performance. As such, a distribution of each binder is optimized in consideration of such effects, to improve product quality and performance.

In this regard, the present invention provides an anode in which, in terms of the anode mixture layer, functions of the rubber-based binder are enhanced in a current collector side to alleviate peeling of the anode mixture layer from the current collector and functions of the water-soluble polymer-based binder are enhanced on the anode mixture layer surface to improve performance of the secondary battery, without suppressing the adhesion between the active materials.

More specifically, it is preferable that the anode mixture layer of the present invention, when divided into 10 equal parts in a thickness direction starting from a surface of the anode current collector, have a ratio ($C_A/C_B$) of a content ratio ($C_A$) of the rubber-based binder at intervals of part 0 to 3 to a total content of the rubber-based binder to a content ratio ($C_B$) of the water-soluble polymer-based binder at intervals of part 0 to 3 to a total content of the water-soluble polymer-based binder of greater than 1.0, and a ratio ($C_A/C_B$) at intervals of part 7 to 10 of smaller than 1.0. It is more preferable that the $C_A/C_B$ of the intervals of part 0 to 3 be 1.02 to 1.50, further more preferably 1.07 to 1.48, and the $C_A/C_B$ of the intervals of part 7 to 10 be 0.50 to 0.98, further more preferably 0.52 to 0.95. In this case, $C_A$ or $C_B$, a content ratio of the rubber-based binder or the water-soluble polymer-based binder, means a value obtained by dividing a content of each binder in a corresponding interval by a content thereof included in an entire interval.

The interval is specified to the intervals of part 0 to 3 and that of 7 to 10 because quality and performance of a product, which are to be improved in the present invention, are related to characteristics of both side interfaces of the mixture layer. A desired level of the quality and performance of a product may be sufficiently achieved, when the above requirements are met in said intervals.

In this case, it is preferable that a content of the rubber-based binder be greater at the intervals of part 0 to 3 than at the intervals of part 7 to 10. In addition, it is preferable that a content of the rubber-based binder be greater at the intervals of part 0 to 3 and smaller at the intervals of part 7 to 10 as compared to a total content thereof in an entire interval. Otherwise, to satisfy the distribution in which the $C_A/C_B$ is greater than 1.0 at the intervals of part 0 to 3 and the $C_A/C_B$ is less than 1.0 at the intervals of part 7 to 10, a variation breath of contents of the water-soluble polymer-based binder needs to be increased in each interval. In contrast to the rubber-based binder, which is water-insoluble, the water-soluble polymer-base binder may have significantly varying viscosity of a slurry prepared in accordance with the content variation. Accordingly, there is an increasing likelihood that a defect may occur during a coating process requiring uniform slurry viscosity.

Further, a ratio ($C_A/C_B$) of a content ratio ($C_A$) of the rubber-based binder to a content ratio ($C_B$) of the water-soluble polymer-based binder may be greater than 1.0 at intervals of part 3 to 5 and smaller than 1.0 at intervals of part 5 to 7.

According to the present invention, in terms of the binder distribution of the anode mixture layer, the rubber-based binder is controlled such that a content thereof is higher in an anode current collector side than in an anode mixture layer surface side, while the water-soluble polymer-based polymer is controlled such that a content thereof is higher in an anode mixture layer surface side than in an anode current collector side. This will serve to alleviate peeling of the anode current collector from the anode mixture layer while improving battery performance.

A method for forming the anode mixture layer is not particularly limited. For example, as previously described, an anode mixture layer-forming slurry (slurry 1) containing a binder content appropriate for the intervals of part 0 to 3 and an anode mixture layer-forming slurry (slurry 2) containing a binder content appropriate for the intervals of part 7 to 10 are prepared, and applied to a copper foil as an anode current collector simultaneously or in order, and dried to prepare the anode mixture layer. The anode mixture layer may be prepared by applying and drying the slurry 1 first followed by applying and drying the slurry 2.

MODE FOR INVENTION

Hereinafter, the present disclosure will be described in more detail with reference to example embodiments. However, the present disclosure should not be limited to the following example embodiments.

Example 1

SBR (A) and CMC (B), as binders, artificial graphite as an anode active material and carbon black as a conductive material were mixed such that weight percentages thereof were 1.8%, 1.2%, 96% and 1%, respectively, and distilled water was added such that a weight of a solid was approximately 50%, and mixed for 100 minutes to prepare an anode slurry 1.

SBR (A) and CMC (B), as binders, artificial graphite as an anode active material and carbon black as a conductive material were mixed, such that weight percentages thereof were 1.2%, 1.2%, 96.6% and 1%, respectively, and distilled water was added such that a weight of the solid is approximately 52%, and mixed for 100 minutes to prepare an anode slurry 2.

The anode slurry 1 was applied to one surface of a copper foil (8 μm-thickness) at a thickness of 60 μm to form a first mixture layer. The anode slurry 2 was then applied on the first mixture layer at a thickness of 60 μm to form a second mixture layer.

The first mixture layer at intervals of part 0 to 5 and the second mixture layer at intervals of part 5 to 10 were formed in a thickness direction based on a surface of the copper foil, and dried in a drying chamber consisting of 4 sections:

Section 1: temp 100° C., air speed 0.42 m/s, drying time 20 sec

Section 2: temp 110° C., air speed 0.47 m/s, drying time 20 sec

Section 3: temp 115° C., air speed 0.50 m/s, drying time 20 sec

Section 4: temp 125° C., air speed 0.77 m/s, drying time 20 sec.

The first and second mixture layers (while on the foil) were then calendered to prepare an anode having a final thickness of 80 μm.

Example 2

SBR (A) and CMC (B), as binders, artificial graphite as an anode active material and carbon black as a conductive material were mixed such that weight percentages thereof were 1.8%, 1.3%, 95.9% and 1%, respectively, and distilled water was added such that a weight of a solid was approximately 52%, and mixed for 100 minutes to prepare an anode slurry 1.

SBR (A) and CMC (B), as binders, artificial graphite as an anode active material and carbon black as a conductive material were mixed such that weight percentages thereof were 1.2%, 1.3%, 96.5% and 1%, respectively, and distilled water was added such that a weight of the solid was approximately 52%, and mixed for 100 minutes to prepare an anode slurry 2.

An anode having the anode mixture layer on the copper foil surface was prepared using the same method as in Example 1.

Example 3

SBR (A) and CMC (B), as binders, artificial graphite as an anode active material and carbon black as a conductive material were mixed such that weight percentages thereof were 1.8%, 1.2%, 96% and 1%, respectively, and distilled water was added such that a weight of a solid was approximately 50%, and mixed for 100 minutes to prepare an anode slurry 1.

SBR (A) and CMC (B), as binders, artificial graphite as an anode active material and carbon black as a conductive material were mixed such that weight percentages thereof were 0.8%, 1.2%, 97% and 1%, respectively, and distilled water was added such that a weight of the solid is approximately 50%, and mixed for 100 minutes to prepare an anode slurry 2.

An anode having the anode mixture layer on the copper foil surface was prepared using the same method as in Example 1.

Example 4

SBR (A) and CMC (B), as binders, artificial graphite as an anode active material and carbon black as a conductive material were mixed such that weight percentages thereof were 1.8%, 1.2%, 96% and 1%, respectively, and distilled water was added such that a weight of a solid was approximately 50%, and mixed for 100 minutes to prepare an anode slurry 1.

SBR (A) and CMC (B), as binders, artificial graphite as an anode active material and carbon black as a conductive material were mixed such that weight percentages thereof were 0.8%, 1.2%, 97% and 1%, respectively, and distilled water was added such that a weight of the solid is approximately 50%, and mixed for 100 minutes to prepare an anode slurry 2.

The anode slurry 1 was applied to one surface of a copper foil (8 μm-thickness) at a thickness of 60 μm and dried in a drying chamber consisting of 4 sections under the following conditions to form a first mixture layer:

Section 1: temp 130° C., air speed 2.01 m/s, drying time 10 sec

Section 2: temp 140° C., air speed 2.01 m/s, drying time 10 sec

Section 3: temp 140° C., air speed 0.60 m/s, drying time 10 sec

Section 4: temp 150° C., air speed 1.01 m/s, drying time 10 sec.

The anode slurry 2 was then applied to the first mixture layer at a thickness of 60 μm and dried in a drying chamber consisting of 4 sections under the same conditions as how the first mixture layer was formed, to form a second mixture layer.

A structure in which the first mixture layer was formed at the intervals of part 0 to 5 and the second mixture layer was formed at the intervals of part 5 to 10 in the thickness direction based on the copper foil surface was formed.

An anode was prepared by calendaring the first and second mixture layers to have a final thickness of 80 μm.

Example 5

SBR (A) and CMC (B), as binders, artificial graphite as an anode active material and carbon black as a conductive material were mixed, such that weight percentages thereof were 1.6%, 1.2%, 96.2% and 1%, respectively, and distilled water was added such that a weight of a solid was approximately 50%, and mixed for 100 minutes to prepare an anode slurry 1.

SBR (A) and CMC (B), as binders, artificial graphite as an anode active material and carbon black as a conductive material were mixed such that weight percentages thereof were 1.4%, 1.2%, 96.4% and 1%, respectively, and distilled water was added such that a weight of the solid was approximately 50%, and mixed for 100 minutes to prepare an anode slurry 2.

The anode slurry 1 was applied to one surface of a copper foil (8 μm-thickness) at a thickness of 60 μm and dried in a drying chamber consisting of 4 sections under the following conditions to form a first mixture layer:

Section 1: temp 130° C., air speed 2.01 m/s, drying time 10 sec

Section 2: temp 140° C., air speed 2.01 m/s, drying time 10 sec

Section 3: temp 140° C., air speed 0.60 m/s, drying time 10 sec

Section 4: temp 150° C., air speed 1.01 m/s, drying time 10 sec.

The anode slurry 2 was then applied to the first mixture layer at a thickness of 60 μm and dried in a drying chamber consisting of 4 sections under the same conditions as how the first mixture layer was formed, to form a second mixture layer.

A structure in which the first mixture layer are formed at the intervals of part 0 to 5 and the second mixture layer are formed at the intervals of part 5 to 10 in the thickness direction based on the copper foil surface was formed.

An anode was prepared by calendering the first and second mixture layers to have a final thickness of 80 μm.

Comparative Example 1

SBR (A) and CMC (B), as binders, artificial graphite as an anode active material and carbon black as a conductive material were mixed such that weight percentages thereof were 1.5%, 1.2%, 96.3% and 1%, respectively, and distilled water was added such that a weight of a solid was approximately 50%, and mixed for 100 minutes to prepare an anode slurry 1.

The anode slurry 1 was applied to one surface of a copper foil (8 μm-thickness) at a thickness of 120 μm and dried in a drying chamber consisting of 4 sections under the following conditions to form a first mixture layer in a thickness intervals of part 0 to 10:

Section 1: temp 100° C., air speed 0.42 m/s, drying time 20 sec

Section 2: temp 110° C., air speed 0.47 m/s, drying time 20 sec

Section 3: temp 115° C., air speed 0.50 m/s, drying time 20 sec

Section 4: temp 125° C., air speed 0.77 m/s, drying time 20 sec.

Thus-prepared mixture layer was calendered to prepare an anode having a final thickness of 80 μm.

Comparative Example 2

SBR (A) and CMC (B), as binders, artificial graphite as an anode active material and carbon black as a conductive material were mixed such that weight percentages thereof were 1.5%, 1.3, 96.2% and 1%, respectively, and distilled water was added such that a weight of a solid was approximately 52%, and mixed for 100 minutes to prepare an anode slurry 1.

The anode slurry 1 was applied to one surface of a copper foil (8 μm-thickness) at a thickness of 120 μm and dried under the same conditions in Comparative Example 1 to form a first mixture layer in a thickness intervals of part 0 to 10.

Thus-prepared first mixture layer was calendered to prepare an anode having a final thickness of 80 μm.

Comparative Example 3

SBR (A) and CMC (B), as binders, artificial graphite as an anode active material and carbon black as a conductive material were mixed such that weight percentages thereof were 0.8%, 1.2, 97% and 1%, respectively, and distilled water was added such that a weight of a solid was approximately 50%, and mixed for 100 minutes to prepare an anode slurry 1.

The anode slurry 1 was applied to one surface of a copper foil (8 μm-thickness) at a thickness of 120 μm and dried under the same conditions in Comparative Example 1 to form a first mixture layer in a thickness intervals of part 0 to 10.

Thus-prepared first mixture layer was calendered to prepare an anode having a final thickness of 80 μm.

Comparative Example 4

SBR (A) and CMC (B), as binders, artificial graphite as an anode active material and carbon black as a conductive material were mixed such that weight percentages thereof were 1.8%, 1.2%, 96% and 1%, respectively, and distilled water was added such that a weight of a solid was approximately 50%, and mixed for 100 minutes to prepare an anode slurry 1.

SBR (A) and CMC (B), as binders, artificial graphite as an anode active material and carbon black as a conductive material were mixed such that weight percentages thereof were 1.2%, 1.2%, 96.6% and 1%, respectively, and distilled water was added such that a weight of the solid is approximately 52%, and mixed for 100 minutes to prepare an anode slurry 2.

The anode slurry 1 was applied to one surface of a copper foil (8 μm-thickness) at a thickness of 60 μm to form a first mixture layer. The anode slurry 2 was then applied to the first mixture layer at a thickness of 60 μm to form a second mixture layer.

The first mixture layer at intervals of part 0 to 5 and the second mixture layer at intervals of part 5 to 10 are formed in a thickness direction based on a surface of the copper foil, and dried in a drying chamber consisting of 4 sections:

Section 1: temp 130° C., air speed 2.01 m/s, drying time 10 sec

Section 2: temp 140° C., air speed 2.01 m/s, drying time 10 sec

Section 3: temp 140° C., air speed 0.60 m/s, drying time 10 sec

Section 4: temp 150° C., air speed 1.01 m/s, drying time 10 sec.

The first and second mixture layers were then calendered to prepare an anode having a final thickness of 80 μm.

Comparative Example 5

SBR (A) and CMC (B), as binders, artificial graphite as an anode active material and carbon black as a conductive material were mixed such that weight percentages thereof were 1.4%, 1.6%, 96% and 1%, respectively, and distilled water was added such that a weight of a solid was approximately 50%, and mixed for 100 minutes.

Due to high viscosity, however, no slurry was obtained, and further procedures for manufacturing an anode were not performed.

Comparative Example 6

SBR (A) and CMC (B), as binders, artificial graphite as an anode active material and carbon black as a conductive material were mixed such that weight percentages thereof were 2%, 0.4%, 96.6% and 1%, respectively, and distilled water was added such that a weight of a solid was approximately 50%, and mixed for 100 minutes to prepare an anode slurry 1.

The anode slurry 1 was applied to one surface of a copper foil (8 μm-thickness) at a thickness of 120 μm. Due to low viscosity, however, the slurry did not stably form a coating layer on the copper foil. In this regard, further procedures for manufacturing an anode were not performed.

Binder Distribution Measurement in Mixture Layer

A binder distribution in the thickness direction was measured with respect to mixture layers of the anodes prepared in Examples 1 to 5 and Comparative Examples 1 to 4, and results thereof are shown in Table 1.

The measurement of the binder distribution was performed by staining the anode mixture layers with $OsO_4$ and cutting a cross-section of the electrode followed by performing SEM-EDAX analysis.

Distribution of an Os element in the cross-section of the mixture layer from the SEM analysis indicates distribution of the rubber-based binder, and that of a Na element indicates distribution of the water-soluble binder.

In Table 1, $C_A$ represents a ratio of the SBR included in a predetermined section (intervals of part 1 to 3 and 7 to 10 in the thickness direction from the current collector) to a total SBR content, and $C_B$ represents a content ratio of the CMC in a predetermined section (intervals of part 0 to 3 and 7 to 10 in the thickness direction from the current collector) to a total CMC content, while $C_A/C_B$ represents a ratio of $C_A$ to $C_B$ contained in a predetermined section (intervals of part 0 to 3 and 7 to 10 in the thickness direction from the current collector).

Figure 2A:
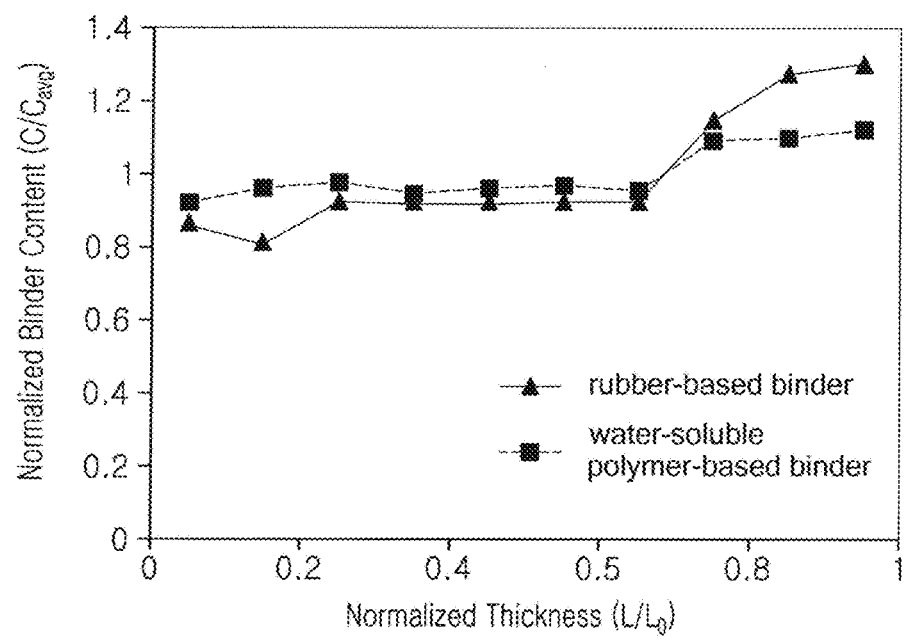
FIGS. 2A and 2B are a graph illustrating content ratios ($C/C_{avg}$) and $C_A/C_B$ in each interval with respect to an average SBR and CMC content in an entire section in Comparative Example 1.
Figure 2B:
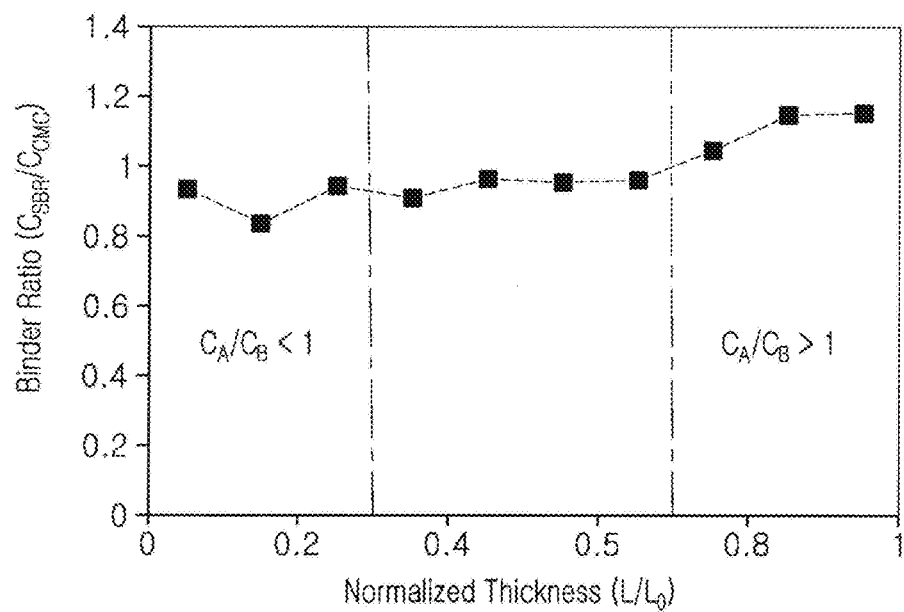
Figure 3A:
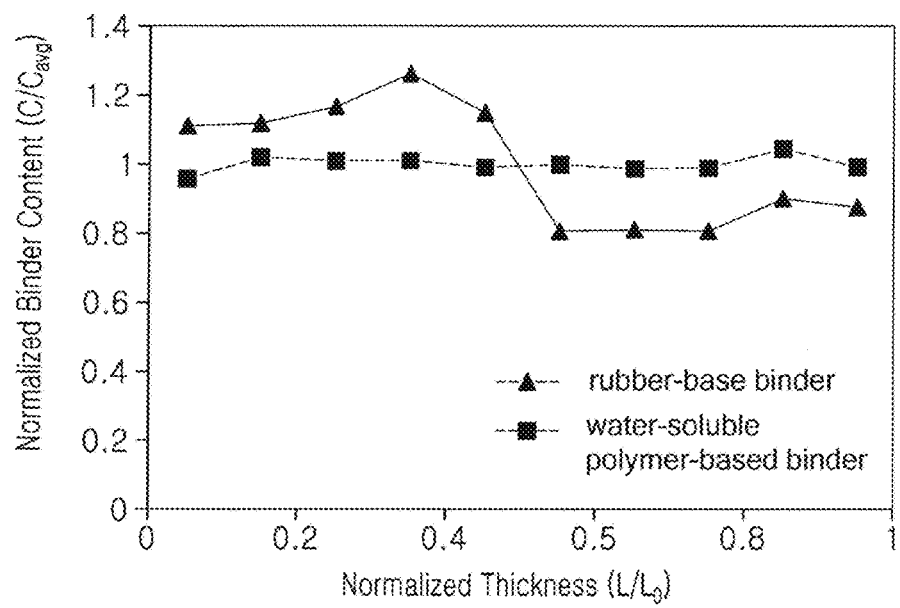
FIGS. 3A and 3B are a graph illustrating content ratios ($C/C_{avg}$) and $C_A/C_B$ in each interval with respect to an average SBR and CMC content in an entire section in Example 1.
Figure 3B:
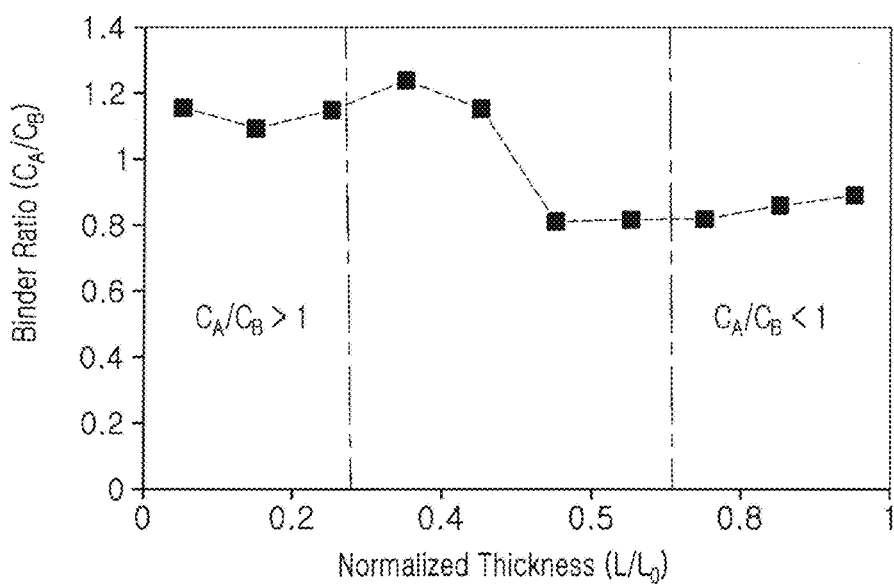

Further, in Example 1 and Comparative Example 1, a content ratio ($C/C_{avg}$) of the SBR or the CMC content to an average SBR content or an average CMC content in an entire interval and $C_A/C_B$ are shown in FIGS. 2 and 3, respectively. In FIGS. 2 and 3, (A) is a graph of $C/C_{avg}$, and (B) is a graph of $C_A/C_B$.

Current Collector Adhesion Measurement

In order to measure adhesion between the mixture layer and the current collector in the electrodes prepared in Examples 1 to 5 and Comparative Examples 1 to 4, 18 mm-wide 3M tape was attached to each electrode, and a 90° peel test was performed.

Load values were measured when the mixture layer and the current collector were separated from each other, and the current collector adhesion was calculated by dividing the load values by the width of the tape, which are shown in Table 1.

Measurement of Electrode Peeling

The electrodes prepared in Examples 1 to 5 and Comparative Examples 1 to 4 were cut into a size of 5 cm×5 cm, and four corners were fixed with tape.

About 1 mL of distilled water was dropped on the mixture layer of the electrode, and allowed to sit for 30 minutes.

Observation was performed with regard to whether distilled water penetrated into the mixture layer and to peel the mixture layer from the current collector with naked eye, which is denoted as ○ (peeled) and x (unpeeled) in Table 1.

Battery Charging/Discharging Efficiency Measurement

Batteries were manufactured using the electrodes prepared in Examples 1 to 5 and Comparative Examples 1 to 4.

Each battery was charged in a constant current (CC) mode of 1.5 C until a voltage thereof reached 4.2V, and charged capacity was measured.

Discharging was performed in a CC mode of 0.3 C until the voltage reached 2.5V, and the discharge capacity was measured.

Figure 4:
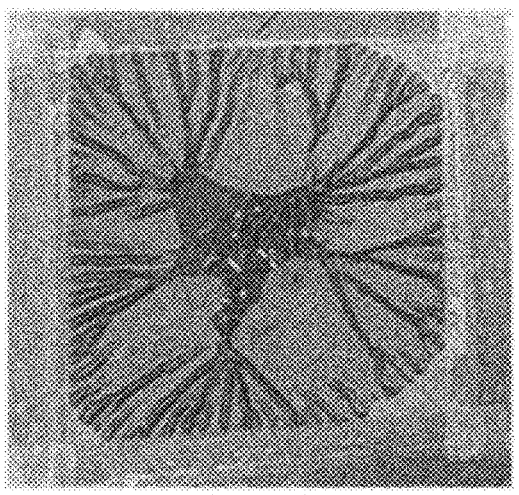
FIG. 4 are photographic images of the permeation of distilled water into an electrode according to an electrode peeling experiment on an anode surface and peeling according thereto in Comparative Example 1 and Example 1.
Figure 4:
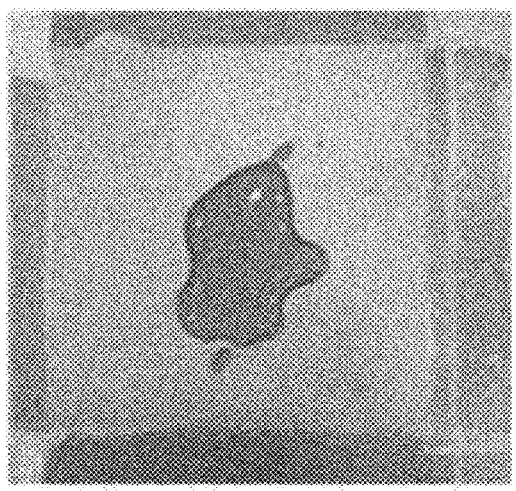

Thus-measured discharging capacity was divided by the charging capacity to calculate the charging/discharging efficiency, and results thereof are shown in Table 1.

into the electrodes of Example 1 and Comparative Example 1 was observed, and photographic images thereof are shown in FIG. 4.

As shown in FIG. 4, distilled water easily penetrated in Comparative Example 1 due to the high CMC content ratio; however, distilled water did not easily penetrate in Example 1. This indicates that electrode peeling from the current collector due to moisture penetration can be inhibited in the present invention.

The anodes of Comparative Examples 1 to 4 showed reduced charging/discharging efficiency as compared to those of Examples 1 to 5. In the case of Comparative Examples 1 to 4, the SBR content ratio ($C_A$) was high at the intervals of part 7 to 10, an anode surface side, as a large amount of SBR particles fill a pore of an active material surface to interfere with diffusion of lithium ions into the anode.

Accordingly, in terms of the anodes of Examples 1 to 5, not only quality but also performance of a product can be improved by optimizing a distribution of each binder for each electrode position even when the same amounts of binders are used.

When the SBR content is low as in Comparative Example 3, adhesion to the current collector is shown to be significantly low, and a problem arises in that the electrode mixture layer or the anode active material is peeled from the current collector. It can be easily predicted that in the case of a significantly low content of the SBR, although an anode slurry, which is controlled in terms of a binder distribution, was not used in Comparative Example 3, adhesion to such a current collector would be significantly reduced even when a binder content is controlled for each interval.

Meanwhile, the same anode slurry 1 and anode slurry 2 were used in Comparative Example 4 as in Example 1, but under different drying conditions. The results of Comparative Example 4 and Example 1 indicate that even though the

TABLE 1

| Items | | Comp. Example | | | | Example | | | | |
|---|---|---|---|---|---|---|---|---|---|---|
| | | 1 | 2 | 3 | 4 | 1 | 2 | 3 | 4 | 5 |
| Total binder content | SBR (A) | 1.5 | 1.5 | 0.8 | 1.5 | 1.5 | 1.5 | 1.3 | 1.3 | 1.5 |
| (wt %) | CMC (B) | 1.2 | 1.3 | 1.2 | 1.2 | 1.2 | 1.3 | 1.2 | 1.2 | 1.2 |
| Binder content ratio | $C_A$ (%) | 26 | 26 | 27 | 26 | 31 | 30 | 33 | 41 | 29 |
| in interval of part | $C_B$ (%) | 29 | 27 | 28 | 28 | 28 | 27 | 27 | 28 | 28 |
| 0~3 | $C_A/C_B$ | 0.91 | 0.96 | 0.96 | 0.93 | 1.09 | 1.10 | 1.22 | 1.46 | 1.04 |
| Binder content ratio | $C_A$ (%) | 37 | 38 | 36 | 38 | 26 | 28 | 24 | 18 | 30 |
| in interval of part | $C_B$ (%) | 33 | 35 | 33 | 33 | 32 | 31 | 33 | 32 | 31 |
| 7~10 | $C_A/C_B$ | 1.12 | 1.08 | 1.09 | 1.15 | 0.85 | 0.90 | 0.72 | 0.53 | 0.97 |
| Current collector adhesion (N/cm) | | 0.22 | 0.24 | 0.11 | 0.07 | 0.24 | 0.26 | 0.23 | 0.33 | 0.23 |
| Electrode peeling | | ○ | ○ | ○ | ○ | x | x | x | x | x |
| Charging/Discharging efficiency (%) | | 97.0 | 97.3 | 99.7 | 96.8 | 99.6 | 99.2 | 100.0 | 100.0 | 98.1 |

As shown in Table 1 and FIGS. 2 and 3, Examples 1 to 5, the cases in which a content ratio $C_A$ of SBR is larger than that $C_B$ of CMC at the intervals of part 0 to 3, close to the current collector ($C_A/C_B>1$), have excellent charging/discharging efficiency, and peeling of the electrode, which is caused due to distilled water, did not occur. In the case of Comparative Examples 1 and 2, however, a content ratio $C_A$ of CMC is larger than that $C_B$ of SBR at the intervals of part 0 to 3, close to the current collector ($C_A/C_B>1$), electrode peeling occurred due to binder swelling induced by water. An electrode peeling experiment due to distilled water penetration was performed on anode surfaces of Comparative Example 1 and Example 1. Penetration of distilled water same anode slurry was used, distributions of binders present in each interval in the thickness direction of the anode mixture layer may vary according to drying conditions.

The above results indicate that by controlling the drying process, an anode having an anode mixture layer having a controlled binder contents for each interval can be prepared as in the present invention.

What is claimed is:

1. An anode for a non-aqueous electrolyte secondary battery, the anode comprising:
   an anode current collector; and
   an anode mixture layer formed on the anode current collector, the anode mixture layer comprising an anode active material, a conductive material, a rubber-based binder and a water-soluble polymer-based binder, wherein when the anode mixture layer is divided into 10 equal intervals in a thickness direction starting from the surface of the anode current collector, the 10 intervals defined by 11 interval parts 0 to 10 with interval part 0 denoting the surface of the current collector, interval part 1 denoting the end of the first interval, interval part 2 denoting the end of the second interval, interval part 3 denoting the end of the third interval and so on and so forth till interval part 10 denoting the end of the tenth interval, $C_{A,7-10}$ is a content ratio of the total amount of rubber-based binder in the intervals 8, 9, and 10 formed between interval parts 7 and 10 to a total amount of the rubber-based binder in all of intervals 1 to 10 formed between interval parts 0 to 10, $C_{B,7-10}$ is a content ratio of the total amount of water-soluble polymer-based binder in the intervals 8, 9, and 10 formed between interval parts 7 and 10 to a total amount of the water-soluble polymer-based binder in all of intervals 1 to 10 formed between interval parts 0 to 10, the $C_{A,7-10}/C_{B,7-10}$ is 0.50 to 0.98, and the $C_{A,7-10}$ is 18 to 30%.

2. The anode for a non-aqueous electrolyte secondary battery of claim 1, wherein the $C_{A,7-10}/C_{B,7-10}$ is 0.52 to 0.97.

3. The anode for a non-aqueous electrolyte secondary battery of claim 1, wherein the $C_{A,7-10}/C_{B,7-10}$ is 0.72 to 0.9, and the $C_{A,7-10}$ is 24 to 28%.

4. The anode for a non-aqueous electrolyte secondary battery of claim 3, wherein the anode is prepared by applying a first anode slurry, applying a second anode slurry, and then drying simultaneously.

5. The anode for a non-aqueous electrolyte secondary battery of claim 1, wherein the $C_{A,7-10}/C_{B,7-10}$ is 0.53 to 0.97, and the $C_{A,7-10}$ is 18 to 30%.

6. The anode for a non-aqueous electrolyte secondary battery of claim 5, wherein the anode is prepared by coating and drying a first anode slurry, and then coating and drying a second anode slurry.

7. The anode for a non-aqueous electrolyte secondary battery of claim 1, wherein the $C_{B,7-10}$ is 31 to 33%.

8. The anode for a non-aqueous electrolyte secondary battery of claim 1, wherein a content of the rubber-based binder is smaller in the intervals 8, 9, and 10 than in the intervals 1, 2, and 3.

9. The anode for a non-aqueous electrolyte secondary battery of claim 1, wherein the content of the rubber-based binder in each of intervals 8, 9, and 10 relative to the respective weight of the anode mixture layer in each of interval 8, 9 and 10 is smaller than the content of the rubber-based binder in all of intervals 1 to 10 relative to the weight of the anode mixture layer in all of intervals 1 to 10.

10. The anode for a non-aqueous electrolyte secondary battery of claim 1, wherein $C_{A,5-7}$ is a content ratio of the total amount of rubber-based binder in the intervals 6 and 7 formed between interval parts 5 and 7 to a total amount of the rubber-based binder in all of intervals 1 to 10 formed between interval parts 0 to 10, $C_{B,5-7}$ is a content ratio of the total amount of water-soluble polymer-based binder in the intervals 6, and 7 formed between interval parts 5 and 7 to a total amount of the water-soluble polymer-based binder in all of intervals 1 to 10 formed between interval parts 0 to 10, and wherein the anode mixture layer has a ratio $C_{A,5-7}/C_{B,5-7}$ less than 1.0.

11. The anode for a non-aqueous electrolyte secondary battery of claim 1, wherein the anode mixture layer comprises 1.0 wt % to 2.5 wt % of the rubber-based binder and 0.5 wt % to 1.5 wt % of the water-soluble polymer-based binder, based on a total weight of the anode mixture layer.

12. The anode for a non-aqueous electrolyte secondary battery of claim 1, wherein the rubber-based binder is at least one selected from the group consisting of a styrene butadiene rubber (SBR), a fluorine-based rubber, an ethylene propylene rubber, a butyl acrylate rubber, a butadiene rubber, an isoprene rubber, an acrylonitrile rubber, an acrylic-based rubber and a silane-based rubber.

13. The anode for a non-aqueous electrolyte secondary battery of claim 1, wherein the water-soluble polymer-based binder is at least one selected from the group consisting of carboxymethylcellulose, cellulose, polyvinylpyrrolidone, polyvinyl alcohol, polyacrylate and derivatives thereof.

14. The anode for a non-aqueous electrolyte secondary battery of claim 1, wherein the anode active material is at least one selected from the group consisting of natural graphite or artificial graphite, soft carbon, hard carbon and a silicon oxide.

15. The anode for a non-aqueous electrolyte secondary battery of claim 1, wherein the conductive material is at least one selected from the group consisting of acetylene carbon black, Ketjenblack, carbon nanotubes, graphene and graphite.

16. A non-aqueous electrolyte secondary battery, comprising the anode of claim 1.

* * * * *